United States Patent [19]

James et al.

[11] Patent Number: 5,334,255
[45] Date of Patent: Aug. 2, 1994

[54] METHOD FOR REMOVING AND RECLAIMING EXCESS PAINT FROM A PAINT SPRAY BOOTH

[75] Inventors: Lawrence E. James, Grosse Ile, Mich.; William C. Walsh, Archbold, Ohio

[73] Assignee: BASF Corporation, Parsippany, N.J.

[21] Appl. No.: 915,041

[22] Filed: Jul. 15, 1992

Related U.S. Application Data

[60] Continuation of Ser. No. 650,366, Feb. 4, 1991, abandoned, which is a division of Ser. No. 445,314, Dec. 4, 1989, abandoned.

[51] Int. Cl.$^5$ .......................... B08B 7/00; C09D 9/00; C11D 7/50
[52] U.S. Cl. ........................................ 134/38; 134/10; 134/12; 252/DIG. 8; 252/153; 252/162; 252/170; 252/171; 252/173; 252/544
[58] Field of Search .............. 134/38, 12, 10; 252/DIG. 8, 153, 162, 170, 171, 173, 544

[56] References Cited

U.S. PATENT DOCUMENTS

| | | | |
|---|---|---|---|
| 3,954,648 | 5/1976 | Belcak et al. | 134/38 |
| 4,085,059 | 4/1978 | Smith et al. | 252/118 |
| 4,102,303 | 7/1978 | Cordier et al. | 118/326 |
| 4,120,810 | 10/1978 | Palmer | 252/153 |
| 4,276,186 | 6/1981 | Bakos et al. | 252/158 |
| 4,339,248 | 7/1982 | Garner | 55/89 |
| 4,378,235 | 3/1983 | Cosper et al. | 55/85 |
| 4,396,405 | 8/1983 | Lindenberger et al. | 55/85 |
| 4,428,871 | 1/1984 | Ward et al. | 252/542 |
| 4,508,634 | 4/1985 | Elepano et al. | 252/163 |
| 4,617,251 | 10/1986 | Sizensky | 252/153 |
| 4,664,721 | 5/1987 | Valasek | 134/26 |
| 4,673,524 | 6/1987 | Dean | 252/118 |
| 4,732,695 | 3/1988 | Francisco | 252/162 |
| 4,749,510 | 6/1988 | Nelson | 252/166 |
| 4,750,919 | 6/1988 | Patzelt et al. | 55/45 |
| 4,764,222 | 8/1988 | Colegrove | 134/38 |
| 4,780,235 | 10/1988 | Jackson | 252/170 |
| 4,812,255 | 3/1989 | Suwala | 252/142 |
| 4,832,706 | 5/1989 | Yates | 51/320 |
| 4,836,950 | 6/1989 | Madsen et al. | 252/153 |
| 4,863,523 | 9/1989 | Goel et al. | 134/22.19 |
| 4,919,691 | 4/1990 | Patzelt et al. | 55/45 |
| 4,927,556 | 5/1990 | Pokorny | 252/173 |
| 5,006,279 | 4/1991 | Grobbel et al. | 252/542 |

FOREIGN PATENT DOCUMENTS

| | | |
|---|---|---|
| 0294041 | 12/1988 | European Pat. Off. . |
| 0389829 | 10/1990 | European Pat. Off. . |
| 8806640 | 9/1988 | PCT Int'l Appl. . |

OTHER PUBLICATIONS

Ibert Mellan, Industrial Solvents, 1950 pp. 643–645.
ASTM Special Technical Publication 7C, pp. 29–31 (1977).

*Primary Examiner*—R. Bruce Breneman
*Assistant Examiner*—Zeinab El-Arini
*Attorney, Agent, or Firm*—Nixon & Vanderhye

[57] ABSTRACT

Methods for removing and reclaiming excess paint from a paint spray booth includes entraining over-sprayed paint particles in a stream of air passing though the pain spray booth and causing the entrained over sprayed paint particles to come into contact with a flowing flood sheet within the paint spray booth such that a substantial portion of the paint particles are solubilized within the flowing aqueous flood sheet and are thereby removed from the stream of air. The solubilized paint particles are then separated and collected from the aqueous flood sheet so as to be reclaimed for future use, whereas the aqueous flood sheet is then recycled to the paint spray booth after the paint particles have been separated therefrom. To permit the reclamation of paint particles, the flood sheet includes an aqueous paint carrier having at least one of an aprotic heterocyclic oxygenate, a $C_4$–$C_6$, lactone or a cyclic carbonate together with at least one organic solvent.

29 Claims, No Drawings

METHOD FOR REMOVING AND RECLAIMING EXCESS PAINT FROM A PAINT SPRAY BOOTH

This is a continuation of copending application Ser. No. 07/650,366 filed on Feb. 4, 1991, now abandoned which is a continuation of co-pending application Ser. No. 07/445,314 filed on Dec. 4, 1989 now abandoned.

BACKGROUND OF THE INVENTION

Great quantities of paints, lacquers, varnishes and clear coat finishes are used in the automobile, appliance, and allied industries to coat finished products. It is well-known that in these industrial paint operations where paint is either applied by a spray-gun apparatus or a Behr Bells system, a portion of the paint is not transferred onto the item being painted. Instead, the paint is left in the air that is present in the paint booth. Currently, industrial paint booths have a series of filtering media to trap the air-borne paint particles before the air from within the paint booth is transferred to the outside environment. The first stage of this filtering process involves the passing of the paint-saturated air through a "curtain" or flood sheet of water. The physical barrier of the water traps the larger paint particles. Since most paint resin systems are hydrophobic, the paint does not become solvated by the water, but will sit on the surface until it comes in contact with a side wall to attach itself to. This creates a major "sticky" clean-up problem. To avoid this problem, a system of chemicals are added to the water "curtain" fluid to "neutralize" the paint to prevent it from sticking to any side wall. This neutralizing process, referred to in the industry as the "detackification" process, chemically alters the paint resin systems so that the paint from this point on cannot be used as a coating. Moreover, the intractable nature of the detackified paint precludes easy recovery of valuable paint compounds such as pigments, solid fillers, and higher boiling point paint solvents. The paint is a cured solid which has to be disposed of. These detackified paint solids floating around in this water curtain or flood sheet fluid (which is in continuous motion) cause foam to be generated. Additional chemicals have to be added to the flood sheet fluid to control this tendency to foam. Since there is some distance between where the paint is sprayed and the point at which the air-borne paint comes in contact with the flood sheet fluid, some of the air-borne paint contacts the walls and the floor of the booth.

The walls and floor, as well as any other paint application equipment in the booth, will build up a thick, tacky coating of this paint if it is not cleaned off on a regular basis. To do this cleaning, various low-boiling solvent systems are utilized. These solvents either end up in the water curtain fluid to be recirculated and eventually evaporate into the air, which is let out to the outside environment, or having low solubility in water, directly pass to the environment.

Current paint applications and clean-up technologies provide no means of trapping the low boiling (highly evaporative) solvents that are used to dilute the paint to a viscosity suitable for spray applications. These solvents also end up evaporating out of the flood sheet fluid system.

Currently, volatile organic solvents are used to flush the unsprayed paint from the spray guns and the bells, and are also used to clean the outside of the hand-operated spray guns in a soak trough. These solvents are in contact with the air in the booth, and approximately forty percent (40%) of the solvent evaporates into the air of the booth. This increases the chances of worker exposure to harmful solvents and also adds these solvents to the air stream which will ultimately be discharged to the outside environment. Additionally, it increases the number of flammable formulations or chemicals that a manufacturer who uses a paint spray booth must have in storage, thus increasing his cost and the chances of accident during their handling.

The proposed invention permits a single formulation to be used for all activities related to paint spray booth clean-up, thus minimizing the chemical hazard safety training required of the paint spray booth operators, the inventory diversity needed to be maintained by the owner, and the quantity of volatile chemicals released to the environment.

An improvement on the current water flood sheet technology to address the problem of trapping some of the paint diluent solvents as well as a portion of the paint booth clean-up solvents is disclosed by the Nalco Chemical Company in their U.S. Pat. No. 4,378,235. This U.S. Patent discloses replacing the water flood sheet fluid with an oil-in-water emulsion system which has been demonstrated to reduce the amount of low boiling solvents evaporating to the open environment. To avoid the cost of re-filling the flood sheet fluid system in the paint booth every time that the paint solids level reached an unmanageable concentration, the oil-in-water emulsion system is continually being reprocessed through a distillation unit. This process is defined in U.S. Pat. No. 4,750,919. Nalco refers to this system as the Hydrocarbon Emissions Controls (HEC) system. The paint trapped by the oil-in water emulsion employed in the HEC system is neutralized or "detackified". This is taught in U.S. Pat. No. 4,750,919. The resultant paint solids cannot be used as a coating. Moreover, the intractable nature of the detackified paint precludes easy recovery of valuable paint compounds such as pigments, solid fillers, and higher boiling point paint solvents. The solids are carried off to be incinerated. The use of low-boiling solvents to clean up the paint overspray on the walls and floor of the paint spray booth is still required with the HEC system.

Accordingly, it would be an advance to the art if a method could be developed for the reclamation of paint and reduction and recovery of volatile organic carriers from paint spray booth systems using an economical absorbing fluid.

A further object of this invention is to provide for the recovery of the paint without detackification, such that said recovered paint could be recycled either in part or as a whole formulated paint.

BRIEF DESCRIPTION OF THE INVENTION

A process for reclaiming paint and volatile organic paint carrier from paint spray booths of the type comprising a chamber, a duct system for passing air down through such chamber to remove paint and volatile organic paint carrier, a sump containing a circulating hydrophilic liquid located at the bottom of the chamber for removing organic paint carrier and paint oversprayed particles and paint from the air containing them, the improvement which comprises using as the hydrophilic liquid in the sump of the spray booth a water containing organic solvent solution containing up to 45 percent by weight of one or more compounds selected from the groups of aprotic heterocyclic oxygenates such as the alkyl N-pyrrolidones, such as N-methyl pyrrolidone, N-ethyl pyrrolidone, and 1,5-dimethyl-2-pyrrolidone, the $C_4$-$C_6$ lactones such as γ-butyrolactone and γ-valerolactone, the N,N'-dialkyl cyclic ureas such as tetrahydro-1,3-dimethyl-2 (1H)-pyrimidinone and 1,3-dimethyl-2-imidazolidinone and the cyclic carbonates such as propylene carbonate; 15 to 52 percent by weight of one or more additional organic solvents, and the balance water, said solution collecting said volatile organic paint carrier and collecting said paint as an uncured resin reusable either as a paint coating material or as separable components for formulating into a paint coating material.

DESCRIPTION OF THE INVENTION

We have discovered a novel method for the improvement of the current water flood sheet technology to address the problem of reclamation of paint and reduction and recovery of volatile organic paint carriers from paint spray booth systems. The invention replaces the water flood sheet fluid and the clean-up solvents for the paint application process found in industrial paint booths with a solution of N-methyl pyrrolidone, other high-boiling solvents, and water. The inventive process utilizing the above-identified flood sheet solution will allow for the following advantageous results. Due to the addition of the solvents to the water, the amount of paint overspray trapped by the flood sheet will be greater than if the flood sheet were pure water, thus reducing the amount of paint particles entering the outside environment.

The flood sheet system will be continually re-distilled to eliminate the cost of emptying and refilling and provide a means to trap some of the solvent utilized as paint diluent, thus lowering the volume of solvent emissions to the environment.

The N-methyl pyrrolidone, solvent(s), and water solution will be a composition that allows it to be used as an agent to clean up the paint overspray that builds up on the walls and floor of the paint booth. This eliminates the need for separate clean-up solvents, and again causes a decrease in the volume of solvent being emitted to the environment outside the paint booth.

Using a solvent/water solution to catch the paint particles eliminates the need for detackifying the paint. The paint overspray particles are solubilized in the solution. This prevents the paint in the flood sheet fluid from adhering to the surfaces in the paint booth system with which it comes in contact. The paint/fluid solution will not need to be treated with the detackifying chemicals and rendered inactive. The paint will remain as a dissolved resin system capable of being reformulated for reuse.

The flood sheet fluid will be fed into an on-site distillation unit on a continuous basis. This is a means to collect the reusable active resin systems and pigments. The recycled or distilled flood sheet solution will be pumped back into the flood sheet system for re-use with necessary make-up water and solvent being added to keep the solution at a constant composition.

The solvent solution of the invention eliminates the need for the addition of chemical defoamers to the flood sheet which are needed for both the pure water as well as the HEC system technologies.

The presence of water mitigates the aggressiveness of the pure organic, energy-saving solvents, thus allowing their use in existing paint spray booth systems without the expense of replacing seals and gaskets. The presence of water also uniquely reduces the vapor pressure of N-methyl pyrrolidone in the solution, minimizing vapor concentration in all areas of the plant where air contacts the flood sheet fluid.

The presence of the solvents reduces the vapor pressure of the water in the solution compared to the water vapor pressure of either a pure water or oil-in-water emulsion; this reduces condensation on spray booth exit air handling equipment such as filters, ducts, and fans, and on cool building and equipment surfaces exposed to flood sheet fluid vapor. This reduces maintenance costs required to replace wet filters and to clean and paint or repair corroded building components or capital and energy costs needed to maintain such surfaces above the dew point temperature of flood sheet fluid equilibrated air streams.

The replacement of volatile purge solvent with the low vapor pressure water solvent solution will minimize solvent emissions and reduce the required variety of chemicals stored by the booth owner.

THE SOLVENT SOLUTION

The solvent solution used in the instant inventive process comprises a solution of N-methyl pyrrolidone (NMP), water, and may contain additional solvent or solvents such as dibasic acid esters or glycol ethers or glycol ether acetates. Said solvent solution contains NMP in an amount of from about 16 to about 45 weight percent. Other solvents may be present, if at all, in an amount of from about 14 to about 52 weight percent total other solvents, the balance being water.

The other solvents that may be used in place of N-methyl pyrrolidone include one or more compounds selected from the groups of aprotic heterocyclic oxygenates such as the alkyl N-pyrrolidones, such as N-ethyl pyrrolidone, and 1,5-dimethyl-2-pyrrolidone, the $C_4$-$C_6$ lactones such as γ-butyrolactone and γ-valerolactone, the N,N'-dialkyl cyclic ureas such as tetrahydro-1,3-dimethyl-2(1H)-pyrimidinone and 1,3-dimethyl-2-imidazolidinone and the cyclic carbonates such as propylene carbonate. As hereinafter and hereinabove used, N-methyl pyrrolidone and/or NMP, means any or any combination of the above identified group of compounds which may be substituted in whole or in part for N-methyl pyrrolidone. These materials are commercially available, or can be prepared by procedures known to those skilled in the art.

The propylene glycol and glycol ether constituent of the present invention is at least one of propylene glycol, polypropylene glycol oligomers or monoalkyl ether or monophenyl ether derivatives of said glycols and oligomers. The glycol oligomers are polymers consisting of two, three or four propylene oxide monomer units terminated at each end with a hydroxy group. The monoalkyl ether derivatives have one to four carbon atoms in the alkyl moiety. Preferably, tripropylene glycol monomethyl ether is used. The amount of propylene glycol or glycol ether used in the composition is generally from about 4 to about 20 percent by weight, preferably from about 7 to about 15.

Solvents that may be used in place of tripropylene glycol monomethyl ether include 2-butoxyethanol, triethylene glycol monomethyl ether, propylene-glycol N-butyl ether, ethylene glycol phenyl butyl ether, propylene glycol phenyl butyl ether, dipropylene glycol N-butyl ether, and dipropylene glycol monomethyl ether.

Ekta Pro EEP (ethyl-3-ethoxy propionate), Eastman Chemical Company, may be used to replace a portion of the DBE. Some of this will be lost to the first distillation cut of paint solvent volatiles so as to permit a purer cut of NMP, with respect to the paint volatiles to be obtained.

The dibasic ester constituent of the present invention is at least one $C_1$–$C_4$ dialkyl ester of at least one $C_2$–$C_6$ aliphatic dibasic acid. Generally, the dibasic ester constituent will be a mixture of at least two and typically three $C_2$–$C_6$ aliphatic dibasic acid esters. Mixtures of $C_2$–$C_6$ aliphatic dibasic acids are a byproduct from the manufacture of adipic acid and the esters are afforded by the esterification of the byproduct stream. Although the composition of such a byproduct stream varies considerably, generally it is composed of 15 to about 30 percent succinic acid, from about 50 to about 73 percent glutaric acid, and from about 6 to about 25 percent adipic acid. Although the ethyl, propyl, and butyl esters are useful, the methyl esters are typically the most economically attractive and, consequently, preferred. Dibasic esters within the scope of the present invention are commercially available from E. I. du Pont de Nemours & Company, Wilmington, Del., U.S.A., or can be prepared by methods known to those skilled in the art.

These other solvents provide some or all of the following advantages to the instant process; lower distillation temperatures giving better economics; better cleaning activity of the walls and equipment in the paint booth, greater ability to suspend solids in solution.

Additionally, it is noted that with the instant process, it is felt that the chemicals which are placed into the current water flood sheets will not be required for the maintenance of a stable recirculation system. However, these chemicals (fungicides/bactericides, defoamers, flocculate, and detackifiers) should be readily soluble in the solutions listed for the instant process with no decrease in the chemical activity associated with said chemical. Thus, they can be used as desired and/or needed without changing the scope of the instant invention.

By choosing high-boiling solvent components to blend with the water, the solvent loss due to evaporation from the flood sheet is minimized to a point where the total emissions from paint shop operations is less than that of the current water flood sheet technology.

The solvents are chosen with the following criteria in mind: (a) high flash point, (b) low degree of aquatic or animal toxicity, and (c) low vapor pressure. Thus, in general, those solvents having the least negative impact on both the worker and the environment outside to the paint booth are chosen. Additionally, the solvents were chosen with a concern for cost and volatility, so that the most expensive solvent would be most volatile and, hence, most completely recovered during the distillation process. The vapor pressure depression of the NMP by water is reversed as the water is removed, with the more volatile paint solvents during the first part of the distillation.

The preferred formulation of the flood sheet fluid utilized in conjunction with the instant invention is illustrated in the following Examples, said Examples being illustrative only and in no way limiting the scope of the instant invention.

EXAMPLE I

This example illustrates the currently best-known composition that meets the criteria of not harming the worker or his outside environment, and also will solubilize the paint as well as be usable as an agent to clean the paint overspray from the walls and floor of the paint booth.

| Component: | Percent by Weight |
|---|---|
| N-methyl pyrrolidone | 32.0 |
| Di Basic Ester | 22.0 |
| Tripropylene glycol-mono methyl ether (TPM) | 10.0 |
| Water | 36.0 |

Preparation

The N-methyl pyrrolidone, Di Basic Ester, and TPM are added to the mixing vessel. The order of addition is not critical. The solvent components are mixed at a slow speed for approximately 30 minutes. After the 30 minute solvent component blend cycle is complete, the water is added to the mixing vessel and the whole system is mixed for approximately an additional 30 minutes.

Distillation of Flood Sheet Fluid for Reclamation of Paint

Examples 2, 4, and 6 had as the flood sheet solution the exact formulation that is described in Example 1. The flood sheet solutions were all prepared following the same procedure outlined in Example 1.

EXAMPLE 2

(A) 1200.00 grams of the solution described in Example 1 was added to a 2000 ml glass beaker. The beaker was placed onto a magnetic stirrer and the speed was increased to a medium setting. Then, 150.0 g of a Flash Red high solids solvent based automotive base coat paint which is a melamine cross-linked thermoset acrylic with 3.7% by weight n-butanol, 17.6% by weight xylene, 0.6% by weight methyl ethyl ketone, 3.1% by weight methanol, 5.5% by weight lead chromate molybdate and 0.8% by weight n-butyl acetate. (BASF Coatings & Colorants E174RE022) was added to the solution. The mixture was left to mix for 30 minutes. The paint was fully dissolved in the solution.

(B) To a 4 liter glass boiling pot was added 1334.07 grams of the above solution. The boiling pot was connected to a glass distillation column, and heat was then applied to the pot. When the temperature of the pot reached 54° C., a vacuum of 120 mm Hg was applied to the whole system. Over a 90 minute period, the temperature of the pot was increased to 141° C. and the vacuum applied to the system was changed to 48 mm Hg. Various solvent blends were collected during the distillation process. The final sample collected was a 70.0 gram mixture of paint and solvent with a viscosity that was similar in consistency to that of the initial paint introduced into the experiment.

EXAMPLE 3

(A) A ⅛ inch thick piece of cold rolled steel (5"×3") was hand sanded with a fine grain sandpaper and then washed with an acetone soak to clean off any rust and grease from the surface.

(B) The steel panel was then coated with approximately 0.002–0.003 inch of the final paint distillate retain sample from Example 2. The paint was applied with a 1½ inch wide polyester bristle brush.

(C) The panel was then placed in convection air oven for 40 minutes with the temperature set at 145° C.

(D) The sample was removed from the oven at the end of 40 minutes and a totally cured film of paint was on the surface of the panel.

EXAMPLE 4

(A) 1200.0 grams of the solution described in Example 1 was added to a 2000 ml glass beaker. The beaker was placed onto a magnetic stirrer and the speed was increased to a medium setting. Then 115.0 g of a Clear Coat (high solids compatible solvent based) automotive paint which is a melamine cross-linked thermoset acrylic with 11.3% by weight of n-butanol, 34.8% by weight xylene and 1.7% by weight of isobutanol. (BASF Coatings & Colorants E04CK303) was added to the solution. The resultant solution was left to mix for 30 minutes. The paint was fully dissolved in the solution.

(B) To a 4 liter glass boiling pot was added 1310.8 grams of the above solution. The boiling pot was then connected to a glass distillation column, and heat was then applied to the pot. The temperature of the pot and contents was raised to approximately 103° C. This temperature was maintained for three hours and 15 minutes. Various solvent mixtures distilled off during this time.

At the 3 hour and 15 minute mark, a vacuum was applied to the system and gradually reduced to 8 mm of Hg over a 1 hour and 45 minute time span. During this time frame, various cuts of solvent were captured from the distillation column.

After 15 minutes with a vacuum of 8 mm Hg being applied to the system, the distillation was stopped. The resulting clear mixture of paint and solvent had a viscosity of the consistency of the original paint.

EXAMPLE 5

(A) A panel identical to the one described in Example 3 was prepared for coating in the same manner as outlined in that example.

(B) The panel was then coated with approximately 0.003–0.005 in. of the final paint distillate retain sample from Example 4. The paint was applied with a 1½ inch wide polyester bristle brush.

(C) The panel was then placed in a convection air oven for 40 minutes with the temperature set at 145° C.

(D) The sample was removed from the oven at the end of minutes, and a totally cured film of paint was on the surface of the panel.

EXAMPLE 6

(A) 1220.0 grams of the solution described in Example 1 was added to a 2000 ml glass beaker. The beaker was placed onto a magnetic stirrer and the speed was increased to a medium setting. Then 115.0 grams of a Flame Red water borne automotive base coat which is a cross-linked thermoset polyester urethane with 0.1 to 1.0% by weight isobutanol, 5 to 15% by weight ethylene glycol butyl ether, 0.1 to 1.0% by weight methyl propyl ketone, 0.1 to 1.0% methyl ethyl ketone, 1 to 5% by weight n-butanol, 0.1 to 1.0% by weight proprietary amine, 0.1 to 1.0% by weight isopropanol, 1 to 5% by weight methyl amyl ketone and 0.1 to 1.0% by weight carbon black, (BASF Coatings & Colorants E55RD021) was added to the solution. The mixture was left to mix for 30 minutes. The paint was fully dissolved in the solution.

(B) To a 4 liter glass boiling pot was added 1331.9 grams of the above solution. The boiling pot was then connected to a glass distillation column, and heat was then applied to the pot. The temperature of the pot and contents was gradually increased for approximately 3 hours. During this 3 hour time span, the vacuum was increased from 11" to 25". Various solvent blends distilled out of the solution during this time span. At the end of the 3 hour period, the temperature was raised to 80° C. and a vacuum of 3 mm Hg was applied to the system. The vacuum and temperature were maintained at these settings for 30 minutes. The distillation was then stopped. The resultant mixture of paint and solvent had a viscosity of the consistency of the initial paint put into solution.

EXAMPLE 7

(A) A sample identical to the one described in Example 3 was prepared for coating in the same manner as outlined in Example 3.

(B) The panel was coated with approximately 0.001–0.002 inch of the final paint distillate retain sample from Example 6. The paint was applied with a 1½ inch wide polyester bristle brush.

(C) The panel was then placed into a convection air oven for 40 minutes with the temperature set at 145° C.

(D) The panel was removed from the oven at the end of 40 minutes, and a totally cured film of paint was on the surface of the panel.

These Examples clearly demonstrate the novel ability of the present inventive process to reclaim the uncured paint resin from the novel sheet fluid such that it may be reused as a paint coating. Nothing in the prior art of paint booth flood sheet processes or compositions teaches this surprising result.

What we claim is:

1. A method for removing and reclaiming excess paint from a paint spray booth comprising the steps of:
   i). entraining over-sprayed paint particles in a stream of air passing through the paint spray booth;
   ii). causing the entrained over-sprayed paint particles to come into contact with a flowing aqueous flood sheet within the paint spray booth such that a substantial portion of said paint particles are solubilized within said flowing aqueous flood sheet and thereby removed from said stream of air, and wherein said flowing aqueous flood sheet consists essentially of an aqueous paint carder which includes;
      A. between about 16 to about 45 percent by weight of at least one aprotic heterocyclic oxygenate selected the group consisting of N-methyl pyrrolidone, N-ethyl pyrrolidone, 1,5-dimethyl-2-pyrrolidone;
      B. between about 14 to 52 percent by weight of at least one organic solvent; and
      C. the balance being water;
   iii). separating and collecting said solubilized paint particles from said aqueous flood sheet, whereby said paint particles are reclaimed; and
   iv). recycling said aqueous flood sheet after separation of said paint particles therefrom according to step iii) to the paint spray booth.

2. The method as in claim 1, wherein the over-sprayed paint includes a system comprised of paint particles and an organic paint carrier, and wherein said step iii) is practiced by distilling said aqueous flood sheet so as to separate said system of paint particles and said organic paint carrier therefrom.

3. The method as in claim 2, wherein said separated system of paint particles and organic paint carder is reused in paint formulations sprayed within the paint spray booth.

4. The method as in claim 1, wherein said aprotic heterocyclic oxygenate consists of N-methyl pyrrolidone.

5. The method as in claim 1, wherein the organic solvent includes at least one glycol component selected from the group consisting of dibasic esters, propylene glycols, polypropylene glycol oligomers, and monoalkyl or monophenyl ether derivatives of propylene glycol and polypropylene glycol oligomers.

6. The method as in claim 5, wherein said organic solvent includes between about 4 to about 20 percent by weight of said at least one glycol component.

7. The method as in claim 5 or 6, wherein the organic solvent is at least one selected from the group consisting of tripropylene glycol monomethyl ether, 2-butoxy ethanol, triethylene glycol monomethyl ether, propylene-glycol N-butyl ether, ethylene glycol phenyl butyl ether, propylene glycol phenyl butyl ether, dipropylene glycol N-butyl ether, and dipropylene glycol monomethyl ether.

8. The method as in claim 1, wherein the organic solvent is a at least one dibasic ester selected from $C_1$–$C_4$ dialkyl ester of at least one $C_2$–$C_6$ aliphatic dibasic acid.

9. The method as in claim 8, wherein a portion of the dibasic ester is replaced by ethyl-3-ethoxy propionate.

10. The method as in claim 1, wherein the organic solvent is a mixture of 2-butoxy ethanol, dipropylene glycol monomethyl ether and a dibasic ester.

11. The method as in claim 1, wherein the heterocyclic oxygenate is present in an amount between about 30 to about 45 percent by weight.

12. A method for removing and reclaiming excess paint from a paint spray booth comprising the steps of:
i). entraining over-sprayed paint particles in a stream of air passing through the paint spray booth;
ii). causing the entrained over-sprayed paint particles to come into contact with a flowing aqueous flood sheet within the paint spray booth such that a substantial portion of said paint particles are solubilized within said flowing aqueous flood sheet and thereby removed from said stream of air, and wherein said flowing aqueous flood sheet consists essentially of an aqueous paint career which includes;
A. between about 16 to about 45 percent by weight of at least one $C_4$–$C_6$ lactone selected from the group consisting of o-butyrolactone and valerlactone;
B. between about 14 to 52 percent by weight of at least one organic solvent; and
C. the balance being water;
iii). separating and collecting said solubilized paint particles from said aqueous flood sheet, whereby said paint particles are reclaimed; and
iv). recycling said aqueous flood sheet after separation of said paint particles therefrom according to step iii), to the paint spray booth.

13. The method as in claim 12, wherein the oversprayed paint includes a system comprised of paint particles and an organic paint carrier, and wherein said step iii) is practiced by distilling said aqueous flood sheet so as to separate said system of paint particles and said organic paint carrier therefrom.

14. The method as in claim 13, wherein said separated system of paint particles and organic paint carrier is reused in paint formulations sprayed within the paint spray booth.

15. The method as in claim 12, wherein the organic solvent includes at least one glycol component selected from the group consisting of dibasic esters, propylene glycols, polypropylene glycol oligomers, and monoalkyl or monophenyl ether derivatives of propylene glycol and polypropylene glycol oligomers.

16. The method as in claim 15, wherein said organic solvent includes between about 4 to about 20 percent by weight of said at least one glycol component.

17. The method as in claim 15 or 16, wherein the organic solvent is at least one selected from the group consisting of tripropylene glycol monomethyl ether, 2-butoxy ethanol, triethylene glycol monomethyl ether, propylene-glycol N-butyl ether, ethylene glycol phenyl butyl ether, propylene glycol phenyl butyl ether, dipropylene glycol N-butyl ether, and dipropylene glycol monomethyl ether.

18. The method as in claim 12, wherein the organic solvent is a at least one dibasic ester selected from $C_1$–$C_4$ dialkyl ester of at least one $C_2$–$C_6$ aliphatic dibasic acid.

19. The method as in claim 18, wherein a portion of the dibasic ester is replaced by ethyl-3-ethoxy propionate.

20. The method as in claim 12, wherein the organic solvent is a mixture of 2-butoxy ethanol, dipropylene glycol monomethyl ether and a dibasic ester.

21. A method for removing and reclaiming excess paint from a paint spray booth comprising the steps of:
i). entraining over-sprayed paint particles in a stream of air passing through the paint spray booth;
ii). causing the entrained over-sprayed paint particles to come into contact with a flowing aqueous flood sheet within the paint spray booth such that a substantial portion of said paint particles are solubilized within said flowing aqueous flood sheet and thereby removed from said stream of air, and wherein said flowing aqueous flood sheet consists essentially of an aqueous paint career which includes;
A between about 16 to about 45 percent by weight of a cyclic carbonate;
B. between about 14 to 52 percent by weight of at least one organic solvent; and
C. the balance being water;
iii). separating and collecting said solubilized paint particles from said aqueous flood sheet, whereby said paint particles are reclaimed; and
iv). recycling said aqueous flood sheet after separation of said paint particles therefrom according to step iii), to the paint spray booth.

22. The method as in claim 21, wherein the oversprayed paint includes a system comprised of paint particles and an organic paint carrier, and wherein said step iii) is practiced by distilling said aqueous flood sheet so as to separate said system of paint particles and said organic paint carrier therefrom.

23. The method as in claim 22, wherein said separated system of paint particles and organic paint carrier is reused in paint formulations sprayed within the paint spray booth.

24. The method as in claim 21, wherein the organic solvent includes at least one glycol component selected from the group consisting of dibasic esters, propylene glycols, polypropylene glycol oligomers, and monoalkyl or monophenyl ether derivatives of propylene glycol and polypropylene glycol oligomers.

25. The method as in claim 24, wherein said organic solvent includes between about 4 to about 20 percent by weight of said at least one glycol component.

26. The method as in claim 24 or 25, wherein the organic solvent is at least one selected from the group consisting of tripropylene glycol monomethyl ether, 2-butoxy ethanol, triethylene glycol monomethyl ether, propylene-glycol N-butyl ether, ethylene glycol phenyl butyl ether, propylene glycol phenyl butyl ether, dipropylene glycol N-butyl ether, and dipropylene glycol monomethyl ether.

27. The method as in claim 21, wherein the organic solvent is a at least one dibasic ester selected from $C_1$–$C_4$ dialkyl ester of at least one $C_2$–$C_6$ aliphatic dibasic acid.

28. The method as in claim 27, wherein a portion of the dibasic ester is replaced by ethyl-3-ethoxy propionate.

29. The method as in claim 21, wherein the organic solvent is a mixture of 2-butoxy ethanol, dipropylene glycol monomethyl ether and a dibasic ester.

* * * * *